(12) United States Patent
Vail et al.

(10) Patent No.: US 9,742,027 B2
(45) Date of Patent: Aug. 22, 2017

(54) ANODE FOR SODIUM-ION AND POTASSIUM-ION BATTERIES

(71) Applicant: Sharp Laboratories of America, Inc., Camas, WA (US)

(72) Inventors: Sean Vail, Vancouver, WA (US); Yuhao Lu, Vancouver, WA (US); Long Wang, Vancouver, WA (US); Motoaki Nishijima, Kanmaki-tyo (JP); Jong-Jan Lee, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 145 days.

(21) Appl. No.: 14/656,808

(22) Filed: Mar. 13, 2015

(65) Prior Publication Data
US 2016/0028086 A1    Jan. 28, 2016

Related U.S. Application Data

(63) Continuation-in-part of application No. 14/472,228, filed on Aug. 28, 2014, which is a (Continued)

(51) Int. Cl.
*H01M 4/58*  (2010.01)
*H01M 10/054* (2010.01)
(Continued)

(52) U.S. Cl.
CPC ............ *H01M 10/054* (2013.01); *C01C 3/11* (2013.01); *H01M 4/0404* (2013.01);
(Continued)

(58) Field of Classification Search
CPC .. H01M 4/0404; H01M 4/1393; H01M 4/625; H01M 4/622; H01M 4/58;
(Continued)

(56) References Cited

U.S. PATENT DOCUMENTS

| 2012/0328936 A1* | 12/2012 | Wessells | H01M 10/054 |
| | | | 429/188 |
| 2013/0089780 A1* | 4/2013 | Uezono | H01M 4/04 |
| | | | 429/211 |
| 2015/0017527 A1* | 1/2015 | Lee | H01M 4/366 |
| | | | 429/213 |

FOREIGN PATENT DOCUMENTS

| JP | 2003/031220 | 1/2003 |
| JP | 2013/089327 | 5/2013 |

OTHER PUBLICATIONS

Ogumi et al., "Electrochemical Lithium Intercalation within Carbonaceous Materials . . . ", Bulletin of the Chemical Society of Japan, 71(1998) 521-534.
(Continued)

*Primary Examiner* — Mark F Huff
*Assistant Examiner* — Monique Wills
(74) *Attorney, Agent, or Firm* — Law Office of Gerald Maliszewski; Gerald Maliszewski

(57) ABSTRACT

A first method for fabricating an anode for use in sodium-ion and potassium-ion batteries includes mixing a conductive carbon material having a low surface area, a hard carbon material, and a binder material. A carbon-composite material is thus formed and coated on a conductive substrate. A second method for fabricating an anode for use in sodium-ion and potassium-ion batteries mixes a metal-containing material, a hard carbon material, and binder material. A carbon-composite material is thus formed and coated on a conductive substrate. A third method for fabricating an anode for use in sodium-ion and potassium-ion batteries provides a hard carbon material having a pyrolyzed polymer coating that is mixed with a binder material to form a carbon-composite material, which is coated on a conductive substrate. Descriptions of the anodes and batteries formed by the above-described methods are also provided.

4 Claims, 6 Drawing Sheets

Related U.S. Application Data continuation-in-part of application No. 14/340,141, filed on Jul. 24, 2014, which is a continuation-in-part of application No. 14/320,352, filed on Jun. 30, 2014, which is a continuation-in-part of application No. 14/271,498, filed on May 7, 2014, which is a continuation-in-part of application No. 14/230,882, filed on Mar. 31, 2014, which is a continuation-in-part of application No. 14/198,755, filed on Mar. 6, 2014, which is a continuation-in-part of application No. 14/198,702, filed on Mar. 6, 2014, which is a continuation-in-part of application No. 14/198,663, filed on Mar. 6, 2014, which is a continuation-in-part of application No. 14/193,782, filed on Feb. 28, 2014, which is a continuation-in-part of application No. 14/193,501, filed on Feb. 28, 2014, which is a continuation-in-part of application No. 14/174,171, filed on Feb. 6, 2014, which is a continuation-in-part of application No. 14/067,038, filed on Oct. 30, 2013, which is a continuation-in-part of application No. 14/059,599, filed on Oct. 22, 2013, which is a continuation-in-part of application No. 13/907,892, filed on Jun. 1, 2013, which is a continuation-in-part of application No. 13/897,492, filed on May 20, 2013, which is a continuation-in-part of application No. 13/872,673, filed on Apr. 29, 2013, which is a continuation-in-part of application No. 13/752,930, filed on Jan. 29, 2013, which is a continuation-in-part of application No. 13/603,322, filed on Sep. 4, 2012, which is a continuation-in-part of application No. 13/523,694, filed on Jun. 14, 2012, which is a continuation-in-part of application No. 13/449,195, filed on Apr. 17, 2012, now Pat. No. 8,957,796, which is a continuation-in-part of application No. 13/432,993, filed on Mar. 28, 2012.

(60) Provisional application No. 62/009,069, filed on Jun. 6, 2014, provisional application No. 62/008,869, filed on Jun. 6, 2014.

(51) Int. Cl.
*H01M 4/04* (2006.01)
*H01M 4/1393* (2010.01)
*H01M 4/62* (2006.01)
*H01M 4/131* (2010.01)
*H01M 4/133* (2010.01)
*H01M 4/1391* (2010.01)
*H01M 4/36* (2006.01)
*H01M 4/38* (2006.01)
*H01M 4/48* (2010.01)
*H01M 4/587* (2010.01)
*C01C 3/11* (2006.01)
*H01M 4/02* (2006.01)

(52) U.S. Cl.
CPC ......... *H01M 4/0471* (2013.01); *H01M 4/131* (2013.01); *H01M 4/133* (2013.01); *H01M 4/1391* (2013.01); *H01M 4/1393* (2013.01); *H01M 4/364* (2013.01); *H01M 4/366* (2013.01); *H01M 4/38* (2013.01); *H01M 4/483* (2013.01); *H01M 4/58* (2013.01); *H01M 4/587* (2013.01); *H01M 4/622* (2013.01); *H01M 4/625* (2013.01); *H01M 2004/021* (2013.01)

(58) Field of Classification Search
CPC .... H01M 10/054; H01M 4/131; H01M 4/133; H01M 4/1391; C01C 3/11
See application file for complete search history.

(56) References Cited

OTHER PUBLICATIONS

M. M. Doeff, Y. Ma, S. J. Visco, and L. C. De Jonghe, "Electrochemical Insertion of Sodium into Carbon", Journal of the Electrochemical Society, 140(1993), L169-L170.

R. Alcàntara et al., "Carbon Black: a Promising Electrode Materials for Sodium-Ion Batteries", Electrochemistry Communications, 3 (2001), 639-642.

X. Xia and J. R. Dahn, "Study of the Reactivity of Na/Hard Carbon with Different Solvents and Electrolytes", Journal of the Electrochemical Society, 159 (2012), A515-A519.

S. Kuze et al., Development of a Sodium Ion Secondary Battery, Sumitomo Kagaku, 2013, 1-13.

A. Ponrouch et al., "High Capacity Hard Carbon Anodes for Sodium Ion Batteries in Additive Free Electrolyte", Electrochemistry Communications, 27(2013), 85-88.

S. Komaba et al., "Electrochemical Na Insertion and Solid Electrolyte Interphase for Hard-Carbon . . . ", Advanced Functional Materials, 21(2011), 3859-3867.

* cited by examiner

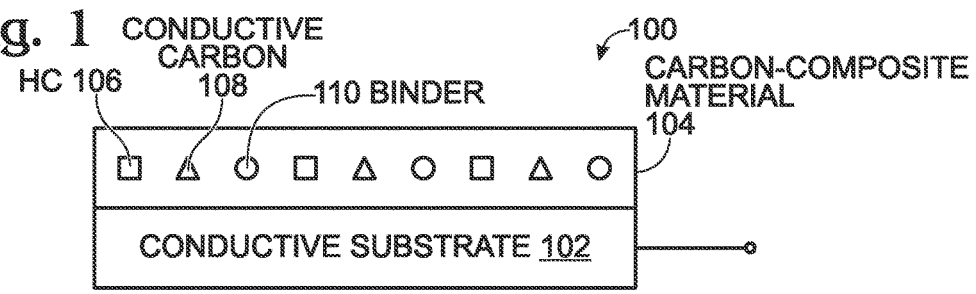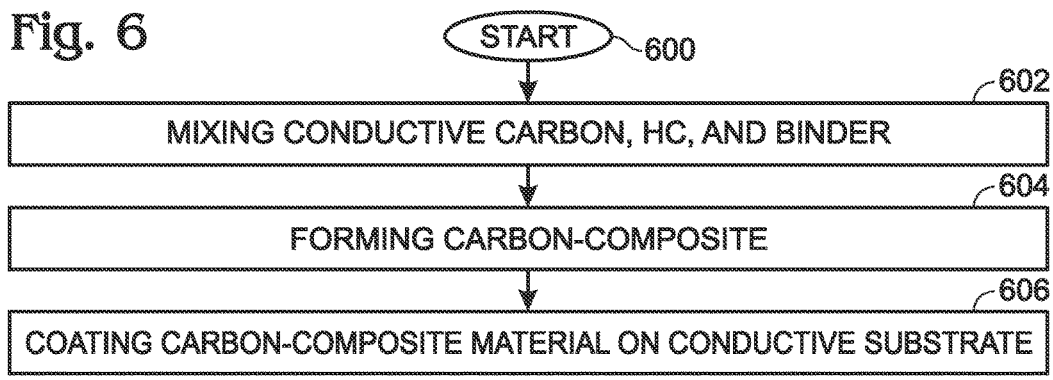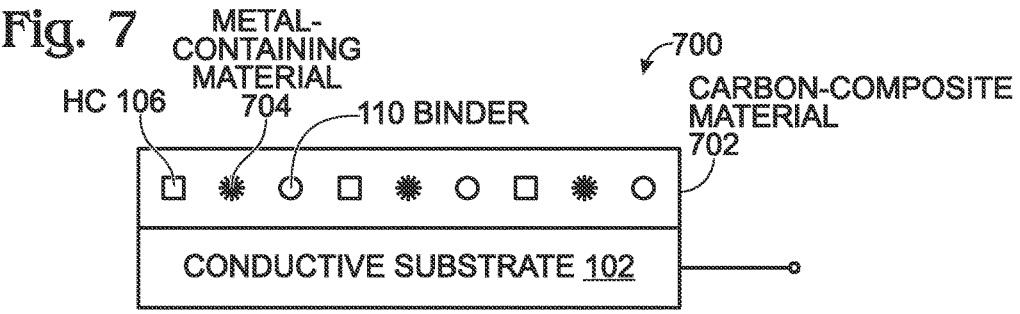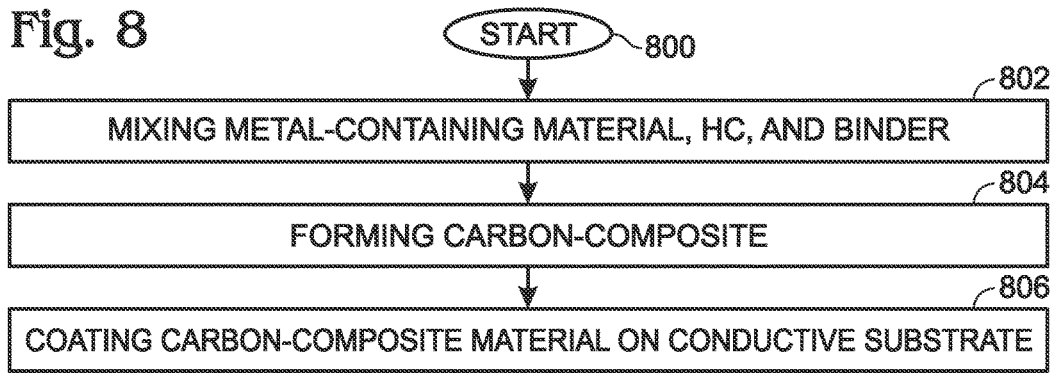

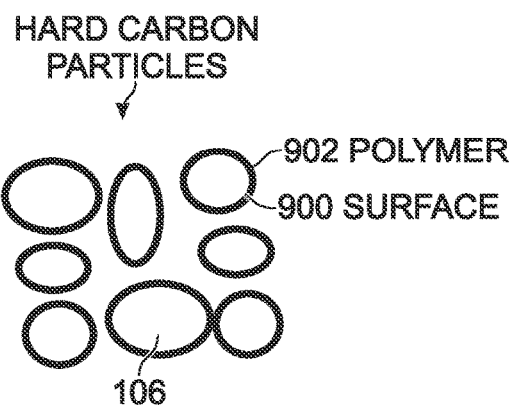
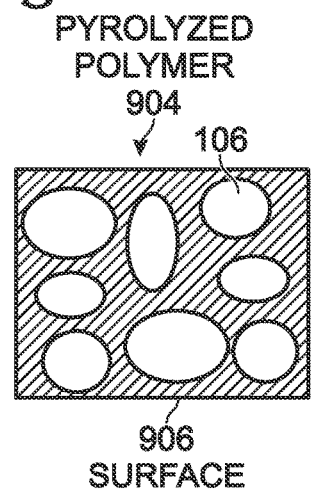
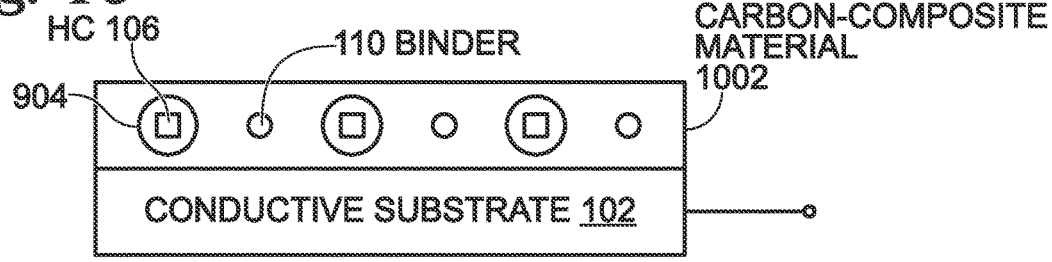
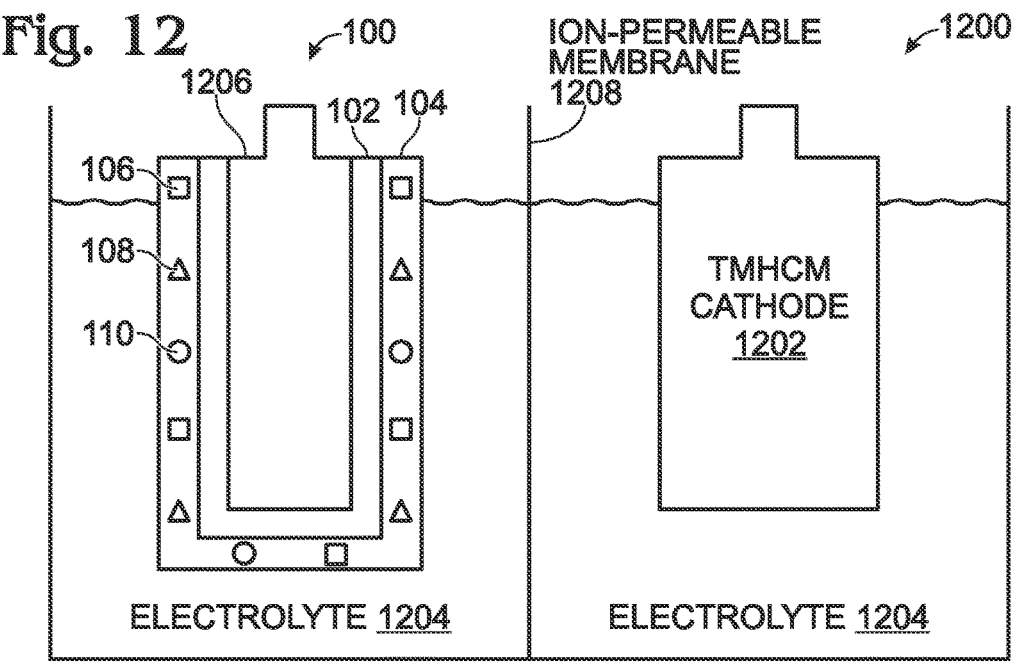

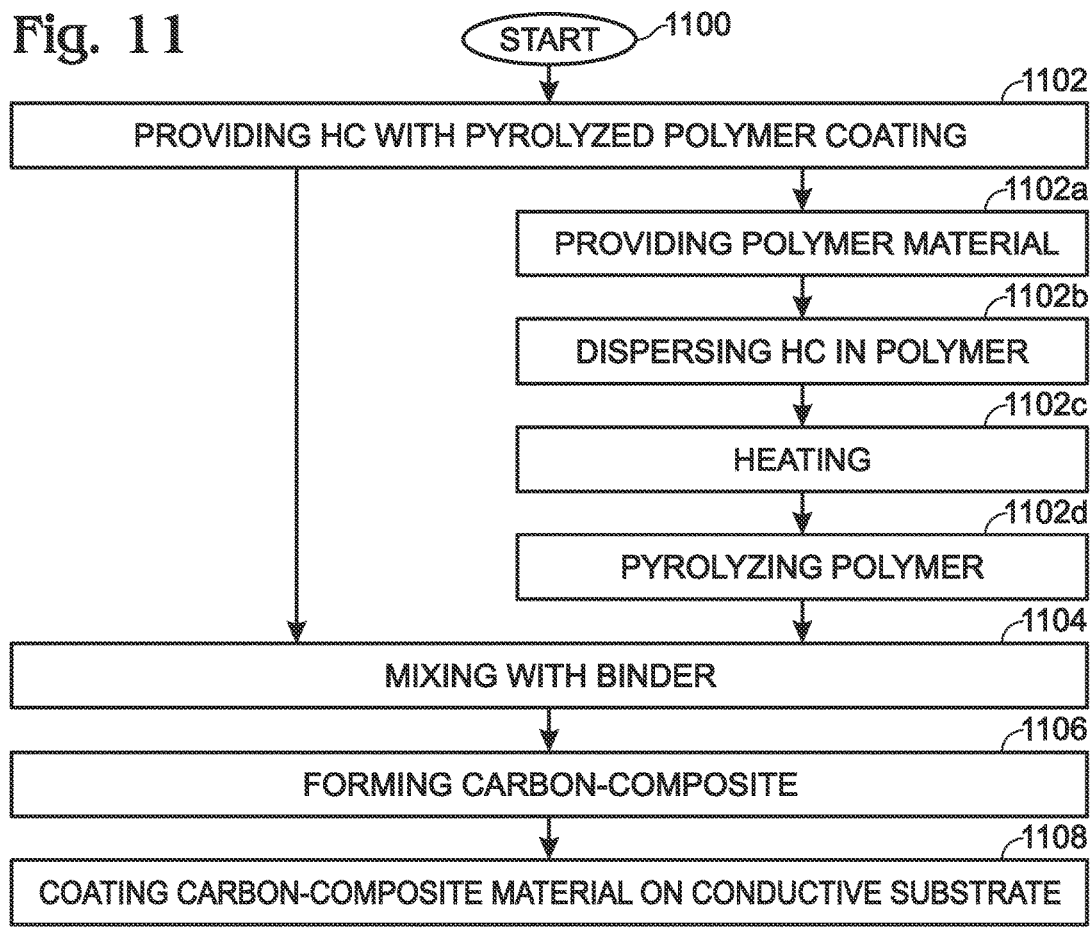
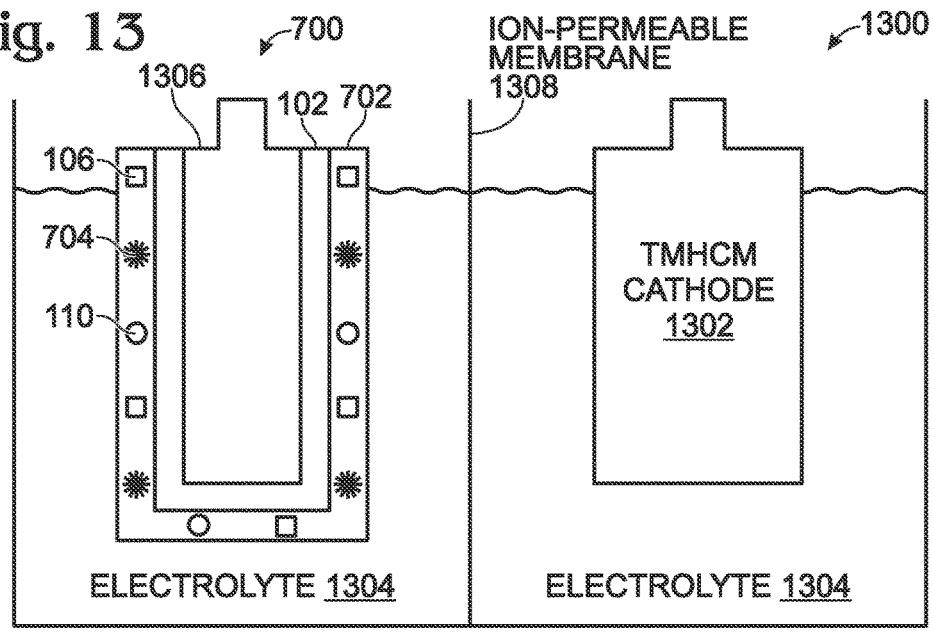

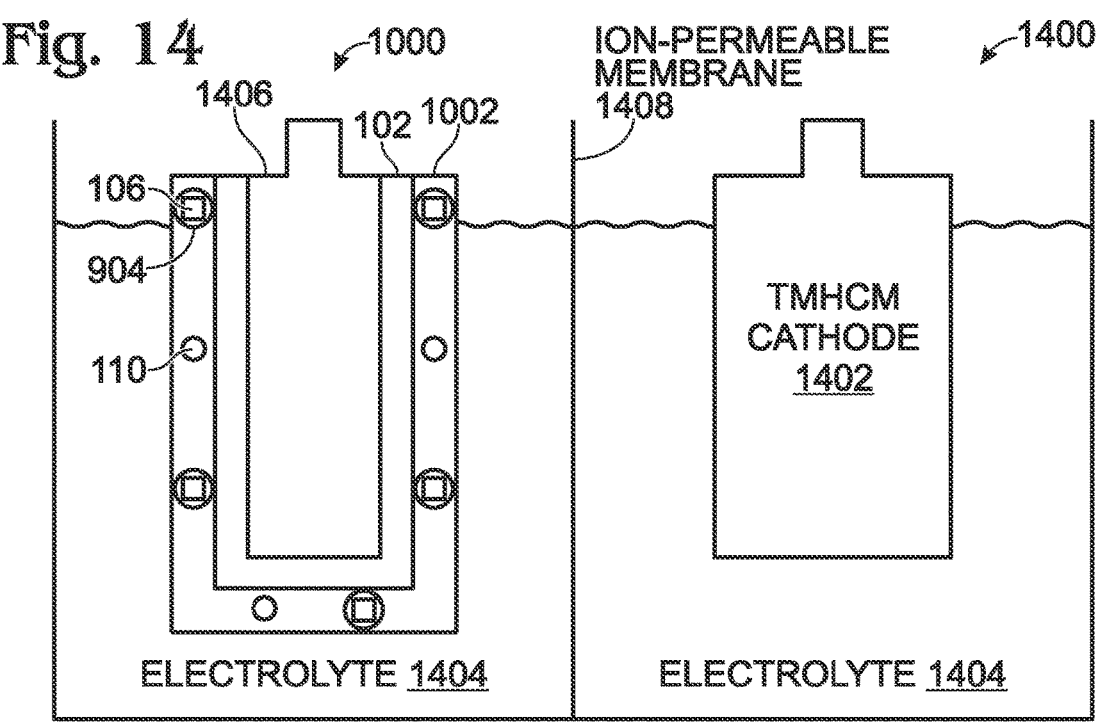

ANODE FOR SODIUM-ION AND POTASSIUM-ION BATTERIES

RELATED APPLICATIONS

This application is a Continuation-in-Part of an application entitled, METHOD FOR THE SYNTHESIS OF IRON HEXACYANOFERRATE, invented by Sean Vail et al, Ser. No. 14/472,228, filed Aug. 28, 2014;

which is a Continuation-in-Part of an application entitled, TRANSITION METAL HEXACYANOMETALLATE ELECTRODE WITH WATER-SOLUBLE BINDER, invented by Long Wang et al, Ser. No. 14/340,141, filed Jul. 24, 2014;

which is a Continuation-in-Part of an application entitled, ELECTROLYTE ADDITIVES FOR TRANSITION METAL CYANOMETALLATE ELECTRODE STABILIZATION, invented by Yuhao Lu et al, Ser. No. 14/320,352, filed Jun. 30, 2014;

Ser. No. 14/320,352 claims the benefit of a Provisional application entitled, HARD CARBON COMPOSITE FOR ALKALI METAL-ION BATTERIES, invented by Xiulei Ji et al, Ser. No. 62/009,069, filed Jun. 6, 2014;

Ser. No. 14/320,352 claims the benefit of a Provisional application entitled, METAL CYANOMETALLATE SYNTHESIS METHOD, invented by Long Wang et al, Ser. No. 62/008,869, filed Jun. 6, 2014;

Ser. No. 14/320,352 is a Continuation-in-Part of an application entitled, RECHARGEABLE METAL-ION BATTERY WITH NON-AQUEOUS HYBRID ION ELECTROLYTE, invented by Long Wang et al, Ser. No. 14/271,498, filed May 7, 2014;

which is a Continuation-in-Part of an application entitled, REACTIVE SEPARATOR FOR A METAL-ION BATTERY, invented by Long Wang et al, Ser. No. 14/230,882, filed Mar. 31, 2014;

which is a Continuation-in-Part of an application entitled, NASICON-POLYMER ELECTROLYTE STRUCTURE, invented by Long Wang et al, Ser. No. 14/198,755, filed Mar. 6, 2014;

which is a Continuation-in-Part of an application entitled, BATTERY WITH AN ANODE PRELOADED WITH CONSUMABLE METALS, invented by Yuhao Lu et al, Ser. No. 14/198,702, filed Mar. 6, 2014;

which is a Continuation-in-Part of an application entitled, BATTERY ANODE WITH PRELOADED METALS, invented by Long Wang et al, Ser. No. 14/198,663, filed Mar. 6, 2014;

which is a Continuation-in-Part of an application entitled, METAL BATTERY ELECTRODE WITH PYROLYZED COATING, invented by Yuhao Lu et al, Ser. No. 14/193,782, filed Feb. 28, 2014;

which is a Continuation-in-Part of an application entitled, METAL HEXACYANOMETALLATE ELECTRODE WITH SHIELD STRUCTURE, invented by Yuhao Lu et al, Ser. No. 14/193,501, filed Feb. 28, 2014;

which is a Continuation-in-Part of an application entitled, CYANOMETALLATE CATHODE BATTERY AND METHOD FOR FABRICATION, invented by Yuhao Lu et al, Ser. No. 14/174,171, filed Feb. 6, 2014;

This application is a Continuation-in-Part of an application entitled, SODIUM IRON(II)-HEXACYANOFERRATE(II) BATTERY ELECTRODE AND SYNTHESIS METHOD, invented by Yuhao Lu et al, Ser. No. 14/067,038, filed Oct. 30, 2013;

which is a Continuation-in-Part of an application entitled, TRANSITION METAL HEXACYANOMETALLATE-CONDUCTIVE POLYMER COMPOSITE, invented by Sean Vail et al., Ser. No. 14/059,599, filed Oct. 22, 2013;

which is a Continuation-in-Part of an application entitled, METAL-DOPED TRANSITION METAL HEXACYANOFERRATE (TMHCF) BATTERY ELECTRODE, invented by Yuhao Lu et al., Ser. No. 13/907,892, filed Jun. 1, 2013;

which is a Continuation-in-Part of an application entitled, HEXACYANOFERRATE BATTERY ELECTRODE MODIFIED WITH FERROCYANIDES OR FERRICYANIDES, invented by Yuhao Lu et al., Ser. No. 13/897,492, filed May 20, 2013;

which is a Continuation-in-Part of an application entitled, PROTECTED TRANSITION METAL HEXACYANOFERRATE BATTERY ELECTRODE, invented by Yuhao Lu et al., Ser. No. 13/872,673, filed Apr. 29, 2013;

which is a Continuation-in-Part of an application entitled, TRANSITION METAL HEXACYANOFERRATE BATTERY CATHODE WITH SINGLE PLATEAU CHARGE/DISCHARGE CURVE, invented by Yuhao Lu et al., Ser. No. 13/752,930, filed Jan. 29, 2013;

which is a Continuation-in-Part of an application entitled, SUPERCAPACITOR WITH HEXACYANOMETALLATE CATHODE, ACTIVATED CARBON ANODE, AND AQUEOUS ELECTROLYTE, invented by Yuhao Lu et al., Ser. No. 13/603,322, filed Sep. 4, 2012.

Ser. No. 13/752,930 is also a Continuation-in-Part of an application entitled, IMPROVEMENT OF ELECTRON TRANSPORT IN HEXACYANOMETALLATE ELECTRODE FOR ELECTROCHEMICAL APPLICATIONS, invented by Yuhao Lu et al., Ser. No. 13/523,694, filed Jun. 14, 2012;

which is a Continuation-in-Part of an application entitled, ALKALI AND ALKALINE-EARTH ION BATTERIES WITH HEXACYANOMETALLATE CATHODE AND NON-METAL ANODE, invented by Yuhao Lu et al., Ser. No. 13/449,195, filed Apr. 17, 2012;

which is a Continuation-in-Part of an application entitled, ELECTRODE FORMING PROCESS FOR METAL-ION BATTERY WITH HEXACYANOMETALLATE ELECTRODE, invented by Yuhao Lu et al., Ser. No. 13/432,993, filed Mar. 28, 2012. All these applications are incorporated herein by reference.

This invention was made with Government support under DE-AR0000297 awarded by DOE. The Government has certain rights in this invention.

BACKGROUND OF THE INVENTION

1. Field of the Invention

This invention generally relates to electrochemical batteries and, more particularly, to a carbonaceous anode for use with sodium-ion and potassium-ion batteries.

2. Description of the Related Art

Although sodium (Na) metal is a good choice for sodium-ion batteries (NIBs), its application in commercial batteries is constrained by safety issues such as flammability, dendrite growth during charge/discharge, and a low melting point. As an alternative to metallic Na, carbonaceous anodes have emerged as attractive candidates for NIBs.

In general, carbonaceous materials have three allotropes, which are diamond, graphite, and buckminsterfullerene [1]. In their application to lithium-ion batteries (LIBs), graphite and its disordered forms are both popular and practical anode materials. Graphite has a typical layered structure into/from which lithium ions ($Li^+$) can reversibly intercalate/deintercalate. Due to the larger sizes of sodium ions ($Na^+$) and potassium ions ($K^+$) relative to lithium ions ($Li^+$), graphite with a small interlayer distance is not appropriate for sodium/potassium intercalation and, consequently, demonstrates a low capacity [2]. Under certain experimental conditions, amorphous carbonaceous materials can be prepared. Depending on the degree of crystallinity, these materials can be further classified as either "soft carbon" (SC, graphitizable carbon) or "hard carbon" (HC, non-graphitizable carbon). Indeed, amorphous carbonaceous materials have demonstrated good performance as anodes in NIBs. Carbon black, a type of soft carbon, was reported as the anode material in NIBs for which sodium was shown to be reversibly inserted into its amorphous and non-porous structures [3], while its reversible capacity was ~200 milliampere hours per gram (mAh/g) between 0 V-2 V (vs. Na/Na$^+$). Since the carbon black has almost negligible porosity, it is believed that its large external surface area facilitates the reaction with sodium. However, the large surface area is also detrimental in terms of a large irreversible capacity for the carbon black anode.

To overcome the small capacities and low coulombic efficiencies of soft carbon materials, hard carbons are being intensively investigated as a NIB anode and have demonstrated reversible capacities exceeding 250 mAh/g [4, 5]. Sodiation of a hard carbon electrode includes two distinct processes. At the high voltage range (slope region), Na$^+$ inserts into the parallel graphene layers. At the low voltage range (plateau region), Na$^+$ intercalates into the pores of hard carbon. However, noteworthy is the fact that the low voltage plateau is very close to 0 V vs. Na/Na$^+$ so that sodium electroplating on hard carbon electrode can proceed when high currents for HC sodiation are applied. At the same time, the high current leads to a reduced capacity due to high polarization for the hard carbon electrode. As a result, conductive carbon black was added into the HC electrode in order to reduce the electrode resistance [6, 7]. Of course, carbon black can contribute to a large irreversible capacity (low coulombic efficiency, CE) for the hard carbon electrode at the first cycle.

A comparison by the Applicants on the impact of several types of conductive carbon additives on hard carbon electrode performance has unambiguously determined that CE is directly related to the surface area of the carbon additives. More specifically, high surface areas for conductive carbon additives were correlated with appreciable irreversible capacities due to solid electrolyte interface (SEI) layer formation on the electrode. In addition, the diverse functional groups on the surfaces of these carbon additives can also contribute to both the high irreversible capacities and low corresponding CE for hard carbon electrode.

It would be advantageous if a hard carbon electrode could be prepared for use in sodium-ion or potassium-ion batteries that demonstrated a large capacity at high currents, as well as high CE at the first cycle.

[1] Z. Ogumi and M. Inaba, "Electrochemical Lithium Intercalation within Carbonaceous Materials: Intercalation Processes, Surface Film Formation, and Lithium Diffusion", *Bulletin of the Chemical Society of Japan*, 71(1998) 521-534.

[2] M. M. Doeff, Y. Ma, S. J. Visco, and L. C. De Jonghe, "Electrochemical Insertion of Sodium into Carbon", *Journal of the Electrochemical Society*, 140(1993), L169-L170.

[3] R. Alcántara, J, M. Jiménez-Mateos, P. Lavela, and J. Tirado, "Carbon Black: a Promising Electrode Material for Sodium-Ion Batteries", *Electrochemistry Communications*, 3 (2001), 639-642.

[4] X. Xia and J. R. Dahn, "Study of the Reactivity of Na/Hard Carbon with Different Solvents and Electrolytes", *Journal of the Electrochemical Society*, 159 (2012), A515-A519.

[5] S. Kuze, J.-i. Kageura, S. Matsumoto, T. Nakayama, M. Makidera, M. Saka, T. Yamaguchi, T. Yamamoto, and K. Nakane, "Development of a Sodium Ion Secondary Battery, SUMITOMO KAGAKU, 2013, 1-13.

[6] A. Ponrouch, A. R. Goni, and M. R. Palacín, "High Capacity Hard Carbon Anodes for Sodium Ion Batteries in Additive Free Electrolyte", *Electrochemistry Communications*, 27(2013), 85-88.

[7] S. Komaba, W. Murata, T. Ishikawa, N. Yabuuchi, T. Ozeki, T. Nakayama, A. Ogata, K. Gotoh, and K. Fujiwara, "Electrochemical Na Insertion and Solid Electrolyte Interphase for Hard-Carbon Electrodes and Application to Na-Ion Batteries", *Advanced Functional Materials*, 21(2011), 3859-3867.

SUMMARY OF THE INVENTION

For the purpose of improving coulombic efficiency (CE), the impact of several types of conductive carbon additives on hard carbon electrode performance has unambiguously determined that reversible capacity and CE are directly related to the surface area of the carbon materials. More specifically, high surface areas for conductive carbon additives is correlated with appreciable irreversible capacities due to solid electrolyte interface (SEI) layer formation on the hard carbon electrode. In addition, the diverse functional groups of these additives can also contribute to both the high irreversible capacities and low CE of hard carbon electrode. Disclosed herein are methods to prepare a hard carbon electrode for sodium-ion and potassium-ion batteries that demonstrates a large capacity at high applied currents as well as high CE with small corresponding irreversible capacity at the first cycle.

The focus of the hard carbon (HC) electrode preparation is to introduce low surface area and electronically conductive additives to reduce electrode resistance, which at the same time, do not significantly increase irreversible capacity. The strategies and associated method(s) for electrode preparation are not limited to hard carbon (HC) electrode but can be extended to include a variety of alternative anodes made from carbonaceous materials including graphite and soft carbon materials.

Disclosed herein are electrode preparation methods for sodium-ion and potassium-ion batteries. The "active" materials for the anode electrode include carbonaceous materials with particular emphasis on hard carbon materials. Conductive carbon materials with small surface areas are introduced into the HC electrode to replace large surface area materials such as carbon black. Alternatively, metal-containing materials can be employed as the electronically conductive additives in the electrode. The metal-containing materials can be deposited or coated on either the HC materials or electrode. Metal-containing materials can be mixed with HC materials in the electrode, or the metal-containing materials can be deposited on the surfaces of HC materials. The HC materials can be dispersed into polymers, or effectively coated by polymers, and subsequently pyrolyzed to afford a conductive coating on the materials.

Accordingly, a first method for fabricating a hard carbon anode, for use in sodium-ion and potassium-ion batteries, mixes a conductive carbon material having a low surface area, a hard carbon material, and a binder material. A carbon-composite material is thus formed, where a carbon-composite material is defined herein as a mixture of two or more different materials, in which at least one material is a carbon material. The carbon-composite material is coated on a conductive substrate. The binder material may, for example, be a polymer or a mixture of polymers. The conductive carbon material has a surface area of less than 100 meters square per gram ($m^2/g$). The binder material functions to "hold together" electrode materials and imparts structural and mechanical integrity to the electrode.

A second method for fabricating an anode, for use in sodium-ion and potassium-ion batteries, mixes a metal-containing material, a hard carbon material, and binder material. A carbon-composite material is this formed and coated on a conductive substrate. The metal-containing material may include a transition metal, and may take the form of an elemental metal, metal hydroxide, metal oxide, or combinations thereof. In another aspect, the metal-containing material excludes materials capable of forming an alloy with sodium and potassium, such as antimony (Sb) or tin (Sn), wherein an alloy is defined as a substance composed of two or more metals, or of a metal or metals with a nonmetal.

A third method for fabricating an anode, for use in sodium-ion and potassium-ion batteries, provides a hard carbon material having a pyrolyzed polymer coating that is mixed with a binder material to form a carbon-composite material, which is coated on a conductive substrate. The hard carbon material with the pyrolyzed polymer coating may be formed by dispersing a hard carbon material within a polymer material and performing a thermal treatment. As a result, the polymer is pyrolyzed, forming a pyrolyzed polymer coating over the hard carbon material.

Additional details of the above-described methods and a description of anodes fabricated using these methods are provided below.

BRIEF DESCRIPTION OF THE DRAWINGS

FIG. 1 is a diagram depicting a hard carbon anode for use with sodium-ion and potassium-ion batteries.

FIG. 6 is a flowchart illustrating the first method for fabricating a hard carbon anode for use in sodium-ion and potassium-ion batteries.

FIG. 7 depicts a second anode for use with sodium-ion and potassium-ion batteries.

FIG. 8 is a flowchart illustrating the second method for fabricating an anode for use in sodium-ion and potassium-ion batteries.

FIGS. 9A and 9B depict steps in a process to form a pyrolyzed polymer coating on a hard carbon material.

FIG. 10 depicts a third anode for use with sodium-ion and potassium-ion batteries.

FIG. 11 is a flowchart illustrating the third method for fabricating an anode for use in sodium-ion and potassium-ion batteries.

FIG. 12 is a partial cross-sectional view of a sodium-ion or potassium-ion battery.

FIG. 13 is a partial cross-section view of a first variation of a sodium-ion or potassium-ion battery.

FIG. 14 is a partial cross-sectional view of a second variation of a sodium-ion or potassium-ion battery.

DETAILED DESCRIPTION

Figure 2:
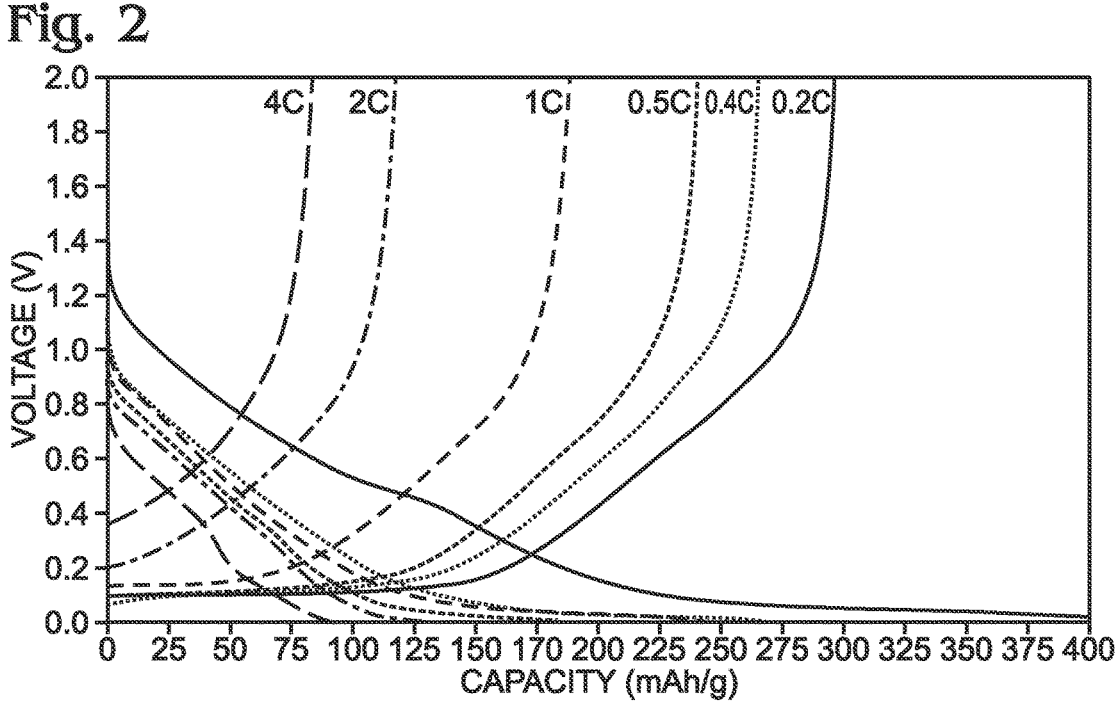
FIG. 2 is a graph depicting 0.2 C, 0.4 C, 0.5 C, 1 C, 2 C and 4 C rate discharge/charge curves for HC/Na half-cells (1.1 mg/$cm^2$ HC loading) cycled between 2 V and 0.005 V using 1M $NaPF_6$ in EC/DEC electrolyte.

In general, within an organic electrolyte, reversible capacity is consumed during the first cycle to form a solid electrolyte interface (SEI) layer on an anode, which suppresses further electrolyte decomposition. The corresponding irreversible capacity is clearly correlated with the surface of area(s) of the entire electrode since the SEI layer completely covers the interface between anode and electrolyte. Ketjenblack, for example, has a surface area of ~1000 square meters per gram ($m^2/g$) that gives rise to a large capacity loss (low coulombic efficiency) at the first cycle. As to a hard carbon electrode, carbon black is often used as an electronically conductive additive to reduce the electrode resistance and polarization. However, it is inevitable that a lower coulombic efficiency at the first cycle arises for a hard carbon electrode, which can be reduced from greater than 90% to 60% or lower. As a result, an HC anode was constructed with an electronically conductive network for use in sodium-ion or potassium-ion batteries, while maintaining a considerable coulombic efficiency.

FIG. 1 is a diagram depicting a hard carbon anode for use with sodium-ion and potassium-ion batteries. The anode 100 comprises a conductive substrate 102, which may be a metal such as copper (Cu), aluminum (Al), or carbon-coated aluminum (CC—Al), for example. A carbon-composite material 104 overlies the conductive substrate 102. The carbon-composite material 104 comprises a hard carbon material 106, a conductive carbon material 108 having a low surface area, and a binder material 110. As used herein, a carbon-composite material is defined as a mixture of two or more different materials, in which at least one material is a carbon material. The conductive carbon material 108 has a surface area of less than 100 meters square per gram ($m^2/g$). The binder material 110 is typically a polymer or mixture of polymers.

[Method 1] Low Surface Area Carbonaceous Materials as Electronically Conductive Additives:

The aforementioned observations indicate that high surface areas for conductive carbon materials lead to a high irreversible capacity and a low coulombic efficiency for a HC anode at the first cycle. In order to circumvent this problem, conductive carbon materials with low surface areas can be employed as electrode additives to prepare the HC electrode. The surface area of the conductive carbon materials can be 0<10 $m^2/g$, 0<20 $m^2/g$, 0<30 $m^2/g$, 0<40 $m^2/g$, 0<50 $m^2/g$, 0<60 $m^2/g$, 0<70 $m^2/g$, 0<80 $m^2/g$, 0<90 $m^2/g$, or 0<100 $m^2/g$. The HC anode materials may be mixed with conductive carbon materials and binders to make the electrode. Examples of binder candidates may be polytetrafluoroethylene (PTFE), polyvinylidene fluoride/difluoride (PVdF), carboxymethyl cellulose (CMC), sodium carboxymethyl cellulose (Na-CMC), styrene-butadiene rubber (SBR), alginic acid, sodium alginate, and combinations thereof, although other binder materials may be used.

Operative examples of high-performance HC electrodes containing low-surface area conductive carbon materials as electrode additives are discussed in this section. Although HC is a carbonaceous anode material used for illustrative purposes, suitable alternatives such as soft carbons and graphite are similarly possible. HC electrodes were prepared using a slurry comprising HC, a low-surface area conductive carbon (surface area ~45 m$^2$/g), and PVdF (KYNAR HSV900) to afford a composition consisting of HC (75 wt %), low-surface area conductive carbon material (20 wt %), and PVdF (5 wt %). The resulting slurry was coated onto Cu foil.

Coin cells (HC/Na half-cells) were fabricated from the aforementioned electrodes with a sodium Na) metal counter electrode, and a Na$^+$-permeable membrane interposed between HC and Na electrodes, with 1M sodium hexafluorophosphate (NaPF$_6$) in ethylene carbonate-diethyl carbonate (EC-DEC) as the electrolyte. Cycling was performed by maintaining the rates for both discharge and charge at 50 milliamperes per gram (mA/g) (0.2 C, 5 cycles)→100 (mA/g) (0.4 C, 5 cycles)→125 mA/g (0.5 C, 10 cycles) →250 mA/g (1 C, 10 cycles)→500 mA/g (2 C, 10 cycles) →1000 mA/g (4 C, 10 cycles)→50 mA/g (0.2 C) thereafter between 2 V and 5 mV. The discharge/charge curves for HC electrodes [HC (75 wt %), low-surface area conductive carbon material (20 wt %), PVdF (5 wt %)/Cu] with 3 different HC mass loadings (1.1 mg/cm$^2$, 2.1 mg/cm$^2$, and 3.3 mg/cm$^2$) in the HC/Na half-cell configuration with 1M NaPF$_6$ (EC-DEC) electrolyte are presented in FIGS. 2-4. The discharge/charge curves for the HC electrode [HC (75 wt %), low-surface area conductive carbon material (20 wt %), PVdF (5 wt %)/Cu] with 1.2 mg/cm$^2$ HC mass loading in HC/Na half-cell configuration with 1M sodium perchlorate (NaClO$_4$) in EC-DEC electrolyte are presented in FIG. 5.

FIG. 2 is a graph depicting 0.2 C, 0.4 C, 0.5 C, 1 C, 2 C and 4 C rate discharge/charge curves for HC/Na half-cells (1.1 mg/cm$^2$ HC loading) cycled between 2 V and 0.005 V using 1M NaPF$_6$ in EC/DEC electrolyte.

Figure 3:
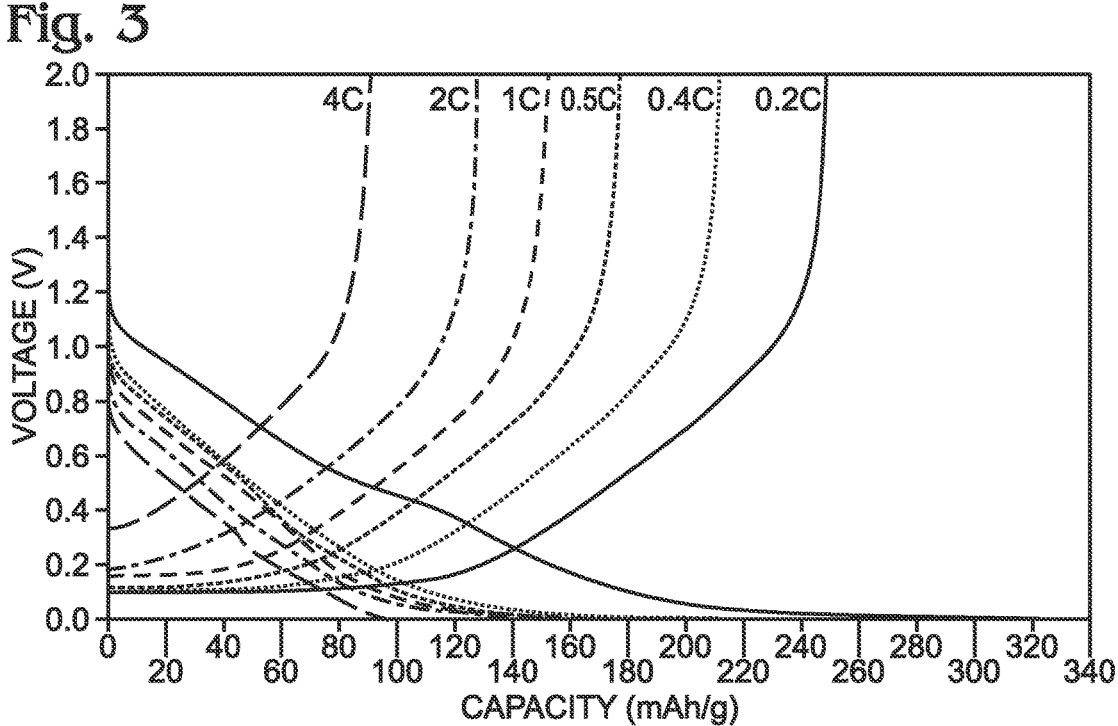
FIG. 3 is a graph depicting 0.2 C, 0.4 C, 0.5 C, 1 C, 2 C and 4 C rate discharge/charge curves for HC/Na half-cells (2.1 mg/$cm^2$ HC loading) cycled between 2 V and 0.005 V using 1M $NaPF_6$ in EC/DEC electrolyte.

FIG. 3 is a graph depicting 0.2 C, 0.4 C, 0.5 C, 1 C, 2 C and 4 C rate discharge/charge curves for HC/Na half-cells (2.1 mg/cm$^2$ HC loading) cycled between 2 V and 0.005 V using 1M NaPF$_6$ in EC/DEC electrolyte.

Figure 4:
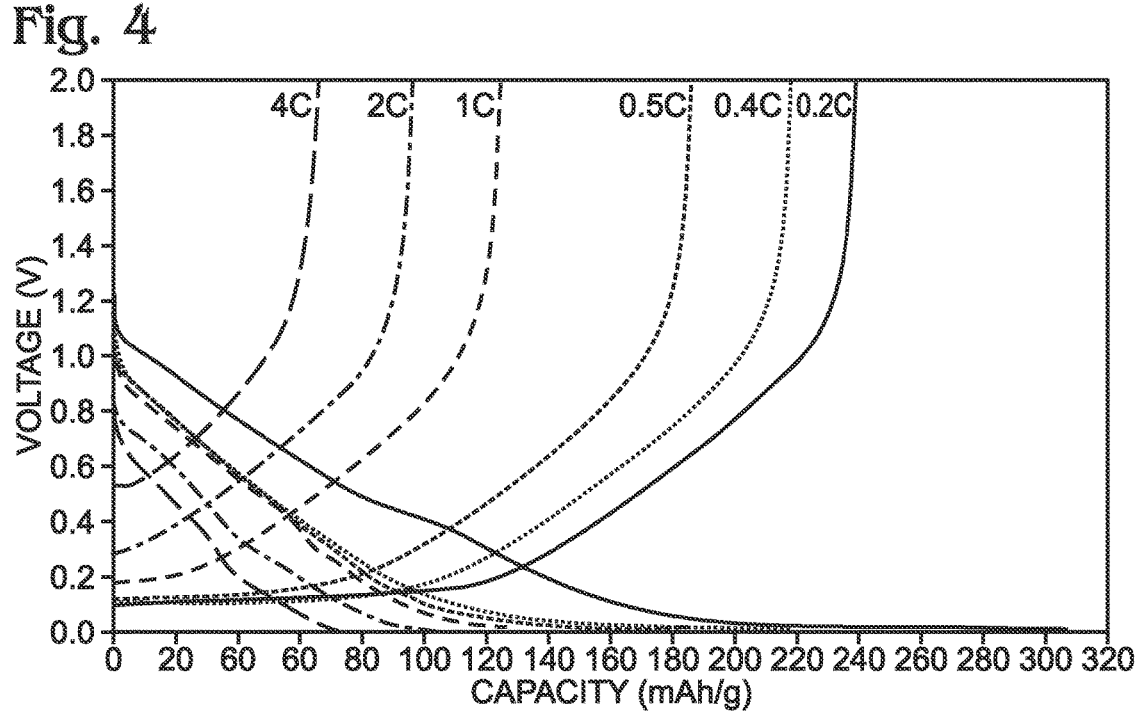
FIG. 4 is a graph depicting 0.2 C, 0.4 C, 0.5 C, 1 C, 2 C and 4 C rate discharge/charge curves for HC/Na half-cells (3.3 mg/$cm^2$ HC loading) cycled between 2 V and 0.005 V using 1M $NaPF_6$ in EC/DEC electrolyte.

FIG. 4 is a graph depicting 0.2 C, 0.4 C, 0.5 C, 1 C, 2 C and 4 C rate discharge/charge curves for HC/Na half-cells (3.3 mg/cm$^2$ HC loading) cycled between 2 V and 0.005 V using 1M NaPF$_6$ in EC/DEC electrolyte.

Figure 5:
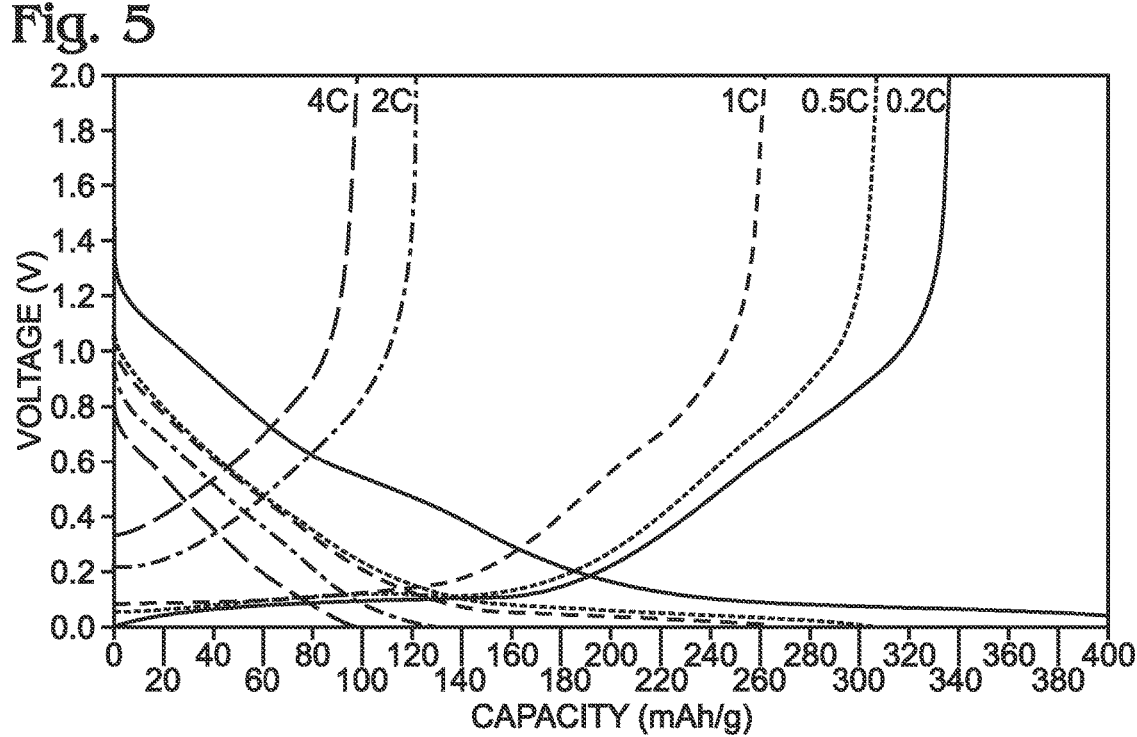
FIG. 5 is a graph depicting 0.2 C, 0.5 C, 1 C, 2 C and 4 C rate discharge/charge curves for HC/Na half-cells (1.2 mg/$cm^2$ HC loading) cycled between 2 V and 0.005 V using 1M $NaClO_4$ in EC/DEC electrolyte.

FIG. 5 is a graph depicting 0.2 C, 0.5 C, 1 C, 2 C and 4 C rate discharge/charge curves for HC/Na half-cells (1.2 mg/cm$^2$ HC loading) cycled between 2 V and 0.005 V using 1M NaClO$_4$ in EC/DEC electrolyte.

As can be seen from FIGS. 2-4, appreciable capacities and corresponding first cycle coulombic efficiencies can be maintained even at moderate to higher C-rates (0.5 C, 1 C) for an HC electrode [HC (75 wt %), low-surface area conductive carbon material (20 wt %), PVdF (5 wt %)/Cu] using 1M NaPF$_6$ (EC-DEC) electrolyte. In general, this can be viewed as a consequence of (1) higher electrode conductivity due to the conductive carbon material as an additive in the HC electrode, and (2) the low surface area (~45 m$^2$/g) of the conductive carbon materials, which does not cannibalize significant capacity during SEI layer formation at the first cycle. With 1M NaClO$_4$ (EC-DEC) electrolyte, capacities ~250 mAh/g are achieved at a 1 C rate, which is higher than that for 1M NaPF$_6$ in EC-DEC electrolyte (~175 mAh/g) with comparable HC mass loadings (1.1-1.2 mg/cm$^2$).

FIG. 6 is a flowchart illustrating the first method for fabricating a hard carbon anode for use in sodium-ion and potassium-ion batteries. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 600.

Step 602 mixes a conductive carbon material having a low surface area, a hard carbon material, and a binder material. Step 604 forms a carbon-composite material, defined herein as a mixture of two or more different materials, in which at least one material is a carbon material. Step 606 coats the carbon-composite material on a conductive substrate. As mentioned above, the binder material may be a polymer or a mixture of polymers. The conductive carbon material typically has a surface area of less than 100 m$^2$/g.

[Method 2] Metal-Containing Materials as Electronically Conductive Additives:

The above-described conductive carbon materials can be substituted by metal-containing materials. The surface area of the metal-containing materials can be 0<10 m$^2$/g, 0<20 m$^2$/g, 0<30 m$^2$/g, 0<40 m$^2$/g, 0<50 m$^2$/g, 0<60 m$^2$/g, 0<70 m$^2$/g, 0<80 m$^2$/g, 0<90 m$^2$/g, 0<100 m$^2$/g, 0<200 m$^2$/g, 0<500 m$^2$/g, or 0<1000 m$^2$/g. The HC material may be mixed with metal-containing materials and binders to make the electrode. A nonexhaustive list of potential binders was included in the previous section.

In addition, the metal-containing materials can be coated on, or be a component of a composite with HC materials. A HC material may be dispersed in an aqueous solution containing a dissolved metal salt or metal complex during which metal ions are absorbed on the surface of the hard carbon material. Upon addition of a chemical agent, such as a base to increase the solution pH, the metal ions absorbed on HC are converted to the corresponding metal hydroxides and/or metal oxides, forming a composite of metal-containing material and HC. In a specific scenario, a composite of Cu and HC can be used as an example. Accordingly, into an aqueous solution of copper(II) ions (Cu$^{2+}$) is dispersed a HC material. During and following mixing, Cu$^{2+}$ are absorbed onto the hard carbon surface. An appropriate solution of sodium hydroxide (NaOH) or similar is used to adjust the solution pH to form a composite of HC and copper hydroxides/copper oxides. The composite is used to fabricate an electrode with an appropriate binder. Following battery assembly and cycling with an appropriate counter electrode, the copper-containing materials in the hard carbon composite electrode are electrochemically reduced to metallic Cu, which consequently, forms a beneficial electronically conducting network within the HC electrode.

FIG. 7 depicts a second anode for use with sodium-ion and potassium-ion batteries. The anode 700 comprises a conductive substrate 102, and a carbon-composite material 702 overlying the conductive substrate. The carbon-composite material 702 comprises a hard carbon material 106, a metal-containing material 704, and a binder material 110. As with the first anode described in FIG. 1, a carbon-composite material is defined herein as a mixture of two or more different materials, in which at least one material is a carbon material. As above, the binder material 110 may be a polymer or mixture of polymers.

In one aspect, the metal-containing material 704 has a surface area of less than 100 m$^2$/g. In another aspect, the metal-containing material 704 includes a transition metal. The metal-containing material 704 may take the form of elemental metals, metal hydroxides, metal oxides, or combinations thereof. Further, in some aspects the metal-containing material explicitly excludes materials capable of forming an alloy with sodium and potassium, where an alloy is defined as a substance composed of two or more metals, or of a metal or metals with a nonmetal.

FIG. 8 is a flowchart illustrating the second method for fabricating an anode for use in sodium-ion and potassium-ion batteries. The method begins at Step 800. Step 802 mixes a metal-containing material, a hard carbon material, and binder material. The binder materials are typically a polymer or polymer mixture. Step 804 forms a carbon-composite material, defined herein as a mixture of two or more different materials, in which at least one material is a carbon material. Step 806 coats the carbon-composite material on a conductive substrate. As noted above, the metal-containing material typically has a surface area of less than 100 $m^2/g$ and may include a transition metal. The metal-containing material may take the form of elemental metals, metal hydroxides, metal oxides, or combinations thereof. In one aspect, the metal-containing material excludes materials capable of forming an alloy with sodium and potassium, as alloy is defined above.

[Method 3] Polymer Composite with Pyrolysis Approach:

In this method HC materials are dispersed in a polymer to form a carbon-composite. Subsequently, the carbon-composite is thermally treated in a furnace at a temperature range of 300-2000° C., preferably under an inert atmosphere (pyrolysis), to afford a pyrolyzed polymer coating on the HC material that is subsequently mixed with appropriate binder to fabricate an electrode. Appropriate polymer materials for forming the pyrolyzed polymer coating include polymers that may have covalent carbon-carbon bonds and may include natural and synthetic polymers.

FIGS. 9A and 9B depict steps in a process to form a pyrolyzed polymer coating on a hard carbon material. Hard carbon 106 is depicted as solid particles with a surface 900. The HC particles 106 are wrapped by polymer 902 first, and then heat-treated under inert atmosphere conditions. The resulting composite 904 has a surface 906. The surface area reduction gives rise to a small capacity consumption during charge/discharge in SEI layer formation. As a result, the pyrolyzed-polymer coated hard carbon material demonstrates a high coulombic efficiency and high capacity as it is used as an anode in sodium-ion and potassium-ion batteries.

FIG. 10 depicts a third anode for use with sodium-ion and potassium-ion batteries. The anode 1000 comprises a conductive substrate 102 and a carbon-composite material 1002 overlying the conductive substrate. The carbon-composite material 1002 comprises a hard carbon material 106 with a pyrolyzed polymer coating 904, and a binder material 110. As above, a carbon-composite material is defined herein as a mixture of two or more different materials, in which at least one material is a carbon material. Also as above, the binder material 110 may be a polymer or mixture of polymers.

FIG. 11 is a flowchart illustrating the third method for fabricating an anode for use in sodium-ion and potassium-ion batteries. The method begins at Step 1100. Step 1102 provides a hard carbon material having a pyrolyzed polymer coating. Step 1104 mixes the hard carbon material having the pyrolyzed polymer coating with a binder material. Typically, the binder material is a polymer or mixture of polymers. Step 1106 forms a carbon-composite material, as defined above. Step 1108 coats the carbon-composite material on a conductive substrate.

Providing the hard carbon material with the pyrolyzed polymer coating in Step 1102 may include the following substeps. Step 1102a provides a polymer material. Step 1102b disperses a hard carbon material within the polymer material. Step 1102c performs a thermal treatment, for example, by heating to a temperature in the range of 300 to 2000 degrees C. In one aspect, the heating is performed in an inert atmosphere. Step 1102d pyrolyzes the polymer.

In summary, hard carbon is common to all three scenarios and is a feature of all three strategies for forming anode electrodes with low surface area and high coulombic efficiency. Furthermore, the anode electrode with HC material benefits from increased conductivity due to an electronically conductive network established by employing (1) conductive carbon materials with a low surface area, (2) metal-containing materials, or (3) pyrolyzed polymer coating on HC. Method 1 (HC plus conductive carbon) and Method 3 (pyrolyzed polymer coating) both involve conductive carbon materials (either physically added or formed as pyrolyzed polymer coating). For the metal-containing approach of Method 2, there are two variations. In the first case, elemental metal particles are mixed with HC. In the more elaborate variation, metal precursors are deposited (e.g., oxides) onto the surface of HC. During the battery first cycle (charge/discharge), the metal oxide is electrochemically (and irreversibly) reduced to elemental metal materials (on HC surface). Subsequently, the formed metal particles (which form a conductive network within the HC electrode), improve the conductivity of the electrode due to the high intrinsic conductivity of metals.

FIG. 12 is a partial cross-sectional view of a sodium-ion or potassium-ion battery. The battery 1200 comprises a transition metal hexacyanometallate (TMHCM) cathode 1202 and an electrolyte 1204. According to the International Union of Pure and Applied Chemistry (IUPAC), a transition metal is defined as "an element whose atom has an incomplete d sub-shell, or which can give rise to cations with an incomplete d sub-shell. In general, transition metals are located in Groups 3 to 12 of the Periodic Table of Elements. Generally, TMHCMs have a chemical formula corresponding to $A_X M1_N M2_M (CN)_6 \cdot_D (H_2O)$ in the discharged state;

where "A" is sodium ($Na^+$), potassium ($K^+$), or a combination of both;

where M1 and M2 are transition metals;

where $_X$ is in the range between greater than 0 to 4;

where $_N$ is in the range of 0 to 2;

where $_M$ is in the range of 0 to 2; and, where $_D$ is in the range of 1 to 6.

The electrolyte 1204 may be non-aqueous, a polymer, gel, or solid material. In the case of non-aqueous (liquid) electrolytes, the electrolyte may consist of a sodium and/or potassium salt dissolved in an organic solvent or mixture of organic solvents. A nonexhaustive list of possible sodium and potassium salts include sodium or potassium hexafluorophosphate ($NaPF_6$ or $KPF_6$), sodium or potassium perchlorate ($NaClO_4$ or $KClO_4$), sodium or potassium tetrafluoroborate ($NaBF_4$ or $KBF_4$), and sodium or potassium bis (trifluoromethanesulfonyl)imide (NaTFSI or KTFSI). Some examples of organic solvents include ethylene carbonate (EC), diethyl carbonate (DEC), dimethylcarbonate (DMC), propylene carbonate (PC), and organic ethers.

The battery also comprises an anode 100. As described in detail in the explanation of FIG. 1, the details of which are not repeated in the interest of brevity, the anode 100 comprises a conductive substrate 102, and a carbon-composite material 104 overlying the conductive substrate. The carbon-composite material 104 comprises a hard carbon material 106, a conductive carbon material 108 having a low surface area, and a binder material 110. As above, a carbon-composite material 104 is defined as a mixture of two or more different materials, in which at least one material is a carbon material. Here, the anode 100 is shown as formed over a current collector 1206, which may for example be a conductive carbon material or metal. In one aspect, the conductive substrate is the current collector. An ion-permeable membrane 1208 separates the anode 100 from the cathode 1202. The ion-permeable membrane 1208 permits sodium and potassium ions to pass between the anode 100 and cathode 1202 during the charging and discharging of the battery. In the case of liquid (non-aqueous) electrolytes, the ion-permeable membrane 1208 interposed between anode and cathode may be a polymer such as commercial materials available from Celgard. In the case of polymer, gel, and solid electrolytes, an additional ion-permeable membrane may not be required since while these electrolytes function as ion-permeable membranes, they also serve to isolate anode from cathode.

FIG. 13 is a partial cross-section view of a first variation of a sodium-ion or potassium-ion battery. This battery 1300 also comprises a TMHCM cathode 1302 and an electrolyte 1304. The electrolyte 1304 may be non-aqueous, a polymer, gel, or solid material, as described above in the description of FIG. 12. As described in detail in the explanation of FIG. 7, the details of which are not repeated in the interest of brevity, the anode 700 comprises a conductive substrate 102 and a carbon-composite material 702 overlying the conductive substrate. This carbon-composite material 702 comprises a hard carbon material 106, a metal-containing material 704, and a binder material 110. Here, the anode 700 is shown as formed over a current collector 1306, which may for example be a conductive carbon material or metal. An ion-permeable membrane 1308 separates the anode 700 from the cathode 1302.

FIG. 14 is a partial cross-sectional view of a second variation of a sodium-ion or potassium-ion battery. The battery 1400 comprises a TMHCM cathode 1402 and an electrolyte 1404. The electrolyte 1404 may be non-aqueous, a polymer, gel, or solid material, as described above. As described in detail in the explanation of FIG. 10, the details of which are not repeated in the interest of brevity, the anode 1000 comprises a conductive substrate 102 and a carbon-composite material 1002 overlying the conductive substrate. This carbon-composite material 1002 comprises a hard carbon material 106 with a pyrolyzed polymer coating 904, and a binder material 110. Here, the anode 1000 is shown as formed over a current collector 1406, which may for example be a conductive carbon material or metal. An ion-permeable membrane 1408 separates the anode 1000 from the cathode 1402.

Methods for the fabrication of sodium-ion and potassium-ion battery anodes have been provided. Examples of particular materials and process details have been presented to illustrate the invention. However, the invention is not limited to merely these examples. Other variations and embodiments of the invention will occur to those skilled in the art.

We claim:

1. A sodium-ion or potassium-ion battery, the battery comprising:
   a transition metal hexacyanometallate (TMHCM) cathode;
   a non-aqueous electrolyte;
   an anode comprising:
     a conductive substrate;
     a carbon-composite material overlying the conductive substrate comprising:
       a hard carbon material;
       a conductive carbon material having a low surface area;
       a binder material;
     wherein a carbon-composite material is defined herein as a mixture of two or more different materials, in which at least one material is a carbon material; and,
   an ion-permeable membrane separating the anode from the cathode.

2. A sodium-ion or potassium-ion battery, the battery comprising:
   a transition metal hexacyanometallate (TMHCM) cathode;
   a non-aqueous electrolyte;
   an anode comprising:
     a conductive substrate;
     a carbon-composite material overlying the conductive substrate comprising:
       a hard carbon material;
       a metal-containing material;
       a binder material;
     wherein a carbon-composite material is defined herein as a mixture of two or more different materials, in which at least one material is a carbon material; and,
   an ion-permeable membrane separating the anode from the cathode.

3. A sodium-ion or potassium-ion battery, the battery comprising:
   a transition metal hexacyanometallate (TMHCM) cathode;
   a non-aqueous electrolyte;
   an anode comprising:
     a conductive substrate;
     a carbon-composite material overlying the conductive substrate comprising a hard carbon material with a pyrolyzed polymer coating;
     a binder material;
     wherein a carbon-composite material is defined herein as a mixture of two or more different materials, in which at least one material is a carbon material; and,
   an ion-permeable membrane separating the anode from the cathode.

4. A sodium-ion or potassium-ion battery, the battery comprising:
   a transition metal hexacyanometallate (TMHCM) cathode;
   a non-aqueous electrolyte;
   an anode comprising:
     a conductive substrate;
     a carbon-composite material overlying the conductive substrate comprising:
       a hard carbon material;
       a metal-containing material, excluding materials capable of forming an alloy with sodium and potassium, wherein an alloy is defined as a substance composed of two or more metals, or of a metal or metals with a nonmetal;
       a binder material;
     wherein a carbon-composite material is defined herein as a mixture of two or more different materials, in which at least one material is a carbon material; and,
   an ion-permeable membrane separating the anode from the cathode.

* * * * *